Aug. 23, 1932.   C. DOERING ET AL   1,873,311
AUTOMATIC BUTTER FORMING AND CUTTING MACHINE
Filed Aug. 11, 1930   3 Sheets-Sheet 1
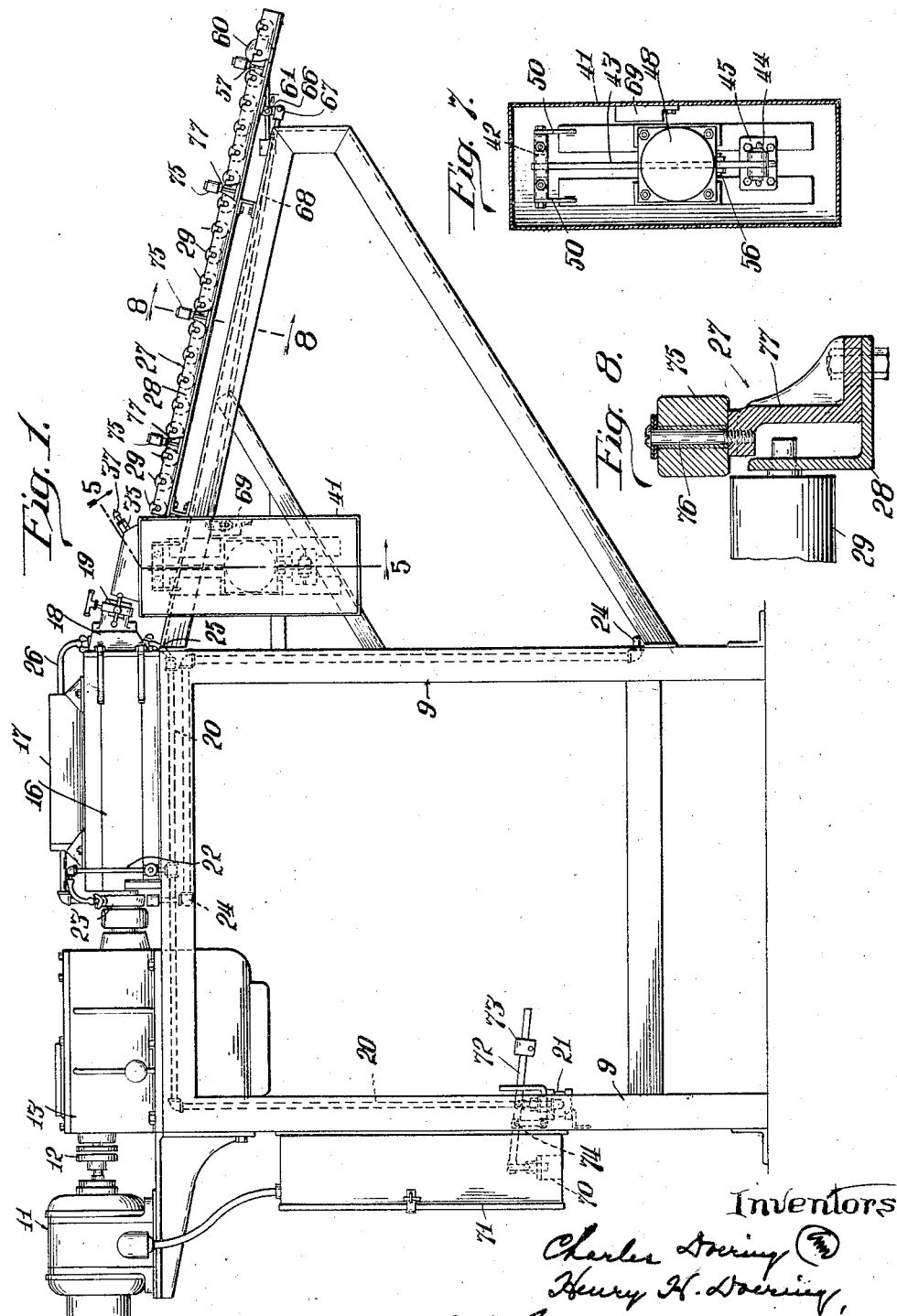

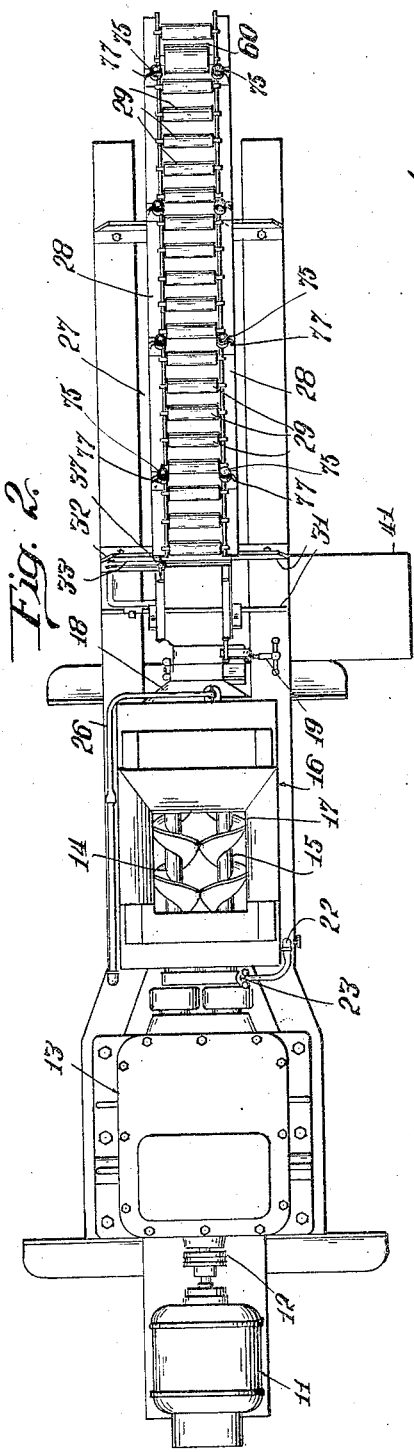
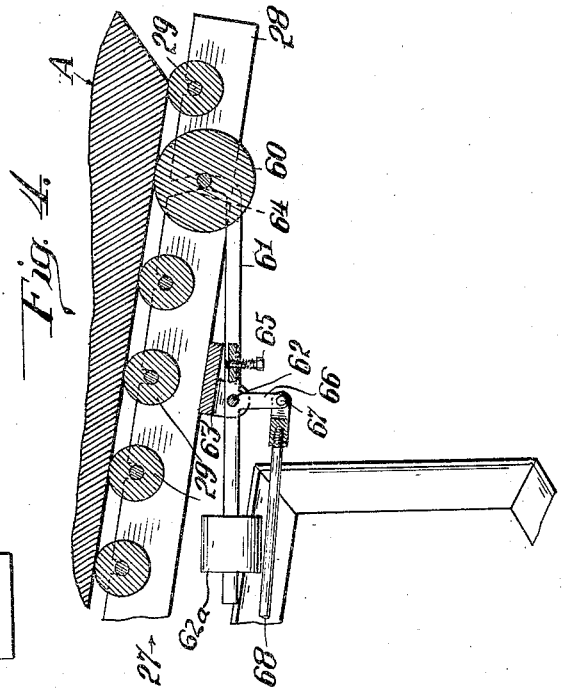
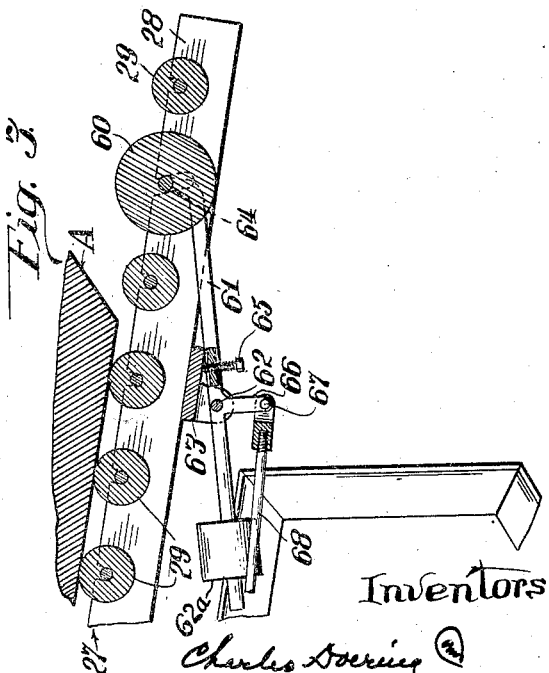

Aug. 23, 1932.  C. DOERING ET AL  1,873,311
AUTOMATIC BUTTER FORMING AND CUTTING MACHINE
Filed Aug. 11, 1930  3 Sheets-Sheet 3
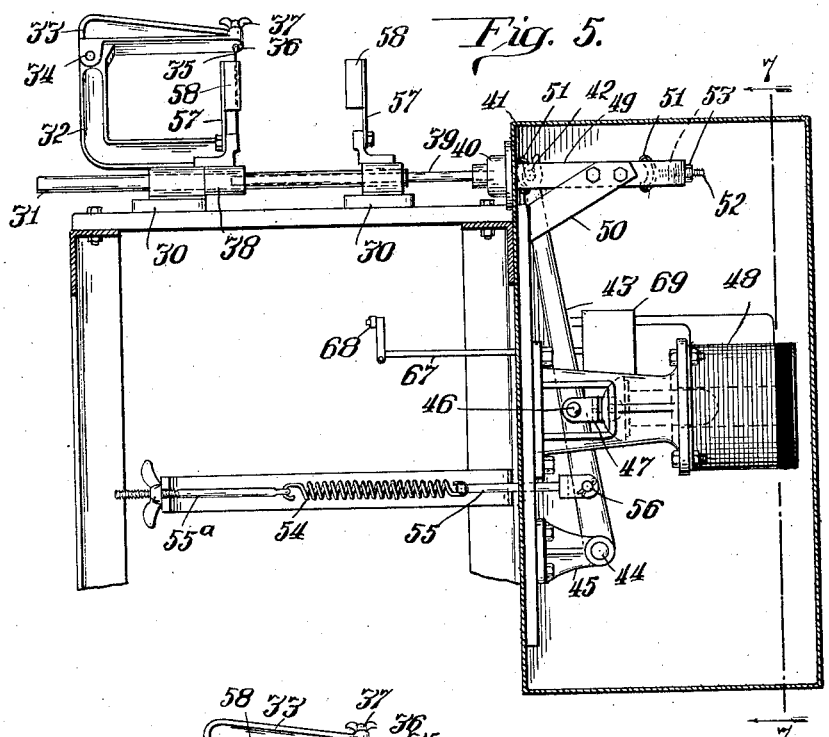
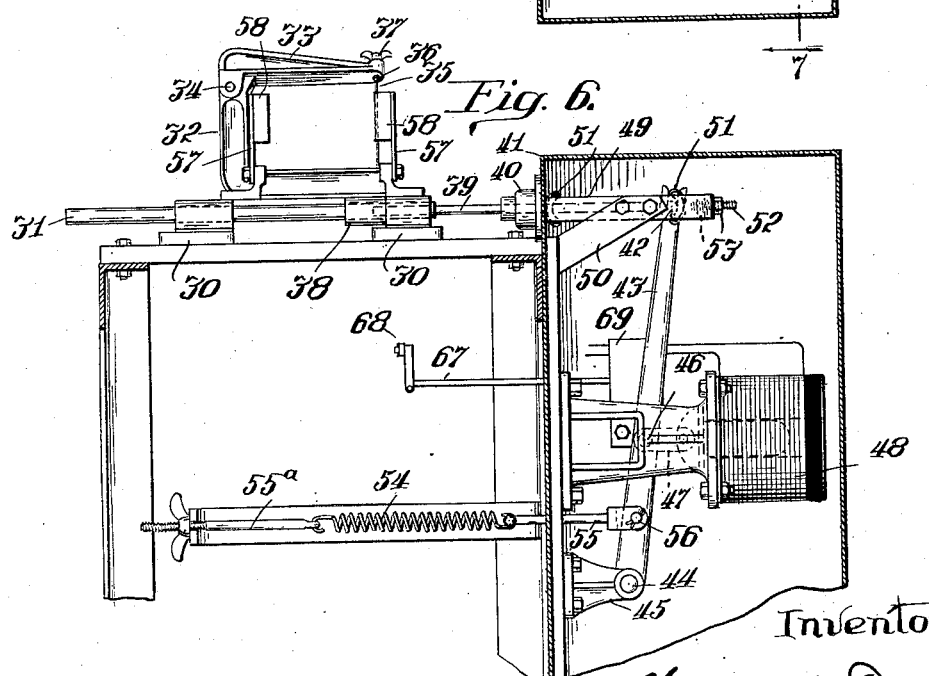

Patented Aug. 23, 1932

1,873,311

UNITED STATES PATENT OFFICE

CHARLES DOERING AND HENRY H. DOERING, OF CHICAGO, ILLINOIS

AUTOMATIC BUTTER FORMING AND CUTTING MACHINE

Application filed August 11, 1930. Serial No. 474,334.

Our invention relates to a butter forming machine whereby the butter is formed into a ribbon of prearranged dimensions, the formed butter or ribbon being discharged along a run-way or race-way and the formed butter or ribbon caused to actuate certain means whereby cutting mechanism is automatically actuated and the ribbon of butter cut.

The particular type of machine illustrated in the drawings is especially intended for use in connection with a separate butter wrapping machine wherein the formed ribbon of butter is cut into predetermined sizes or prints; although it is apparent that our invention may be employed in conjunction with a machine adapted to initially cut the formed butter into prints of the desired size.

The invention also has for its object the provision of means whereby the flow of a heating medium to the spiral worms and to the forming head of the machine will be automatically controlled by the passage of the ribbon of butter along the run-way.

Specifically stated, our invention relates to an electrically operated machine wherein the spiral worms which force the butter through the forming head are driven by an electric motor; the valve in the heating medium supply line is controlled by a solenoid, and the cutting mechanism is also actuated by a solenoid; the motor and solenoids being arranged in an electric circuit involving switch mechanism which is adapted to be controlled by the means actuated by the ribbon of butter passing along the run-way whereby current to the motor is shut off and the solenoids energized so as to actuate the valve and the cutting mechanism. The object of the invention is to provide an automatically controlled machine.

The objects and advantages of our invention will be comprehended from the detailed description of the accompanying drawings, wherein—

Figure 1 is a side elevation of a butter forming and cutting machine provided with our invention; with certain portions being shown in section.

Figure 2 is a top plan view thereof.

Figure 3 is a detail sectional view of a portion of the butter race-way or run-way with the control means for controlling the butter cutting mechanism; the figure illustrating the mechanism in normal position prior to contact of butter therewith.

Figure 4 is a similar view illustrating a ribbon of butter in contact with said control means, illustrating the latter positioned for controlling the power for actuating the main portion of the machine, the heating medium supply valve and the butter cutting mechanism.

Figure 5 is a vertical sectional view taken substantially on the line 5—5 of Figure 1 looking in the direction of the arrows and showing the cutting mechanism in normal position.

Figure 6 is a similar view illustrating the cutting mechanism at the completion of the butter cutting operation.

Figure 7 is a detail sectional view taken substantially on the line 7—7 of Figure 5 looking in the direction of the arrows.

Figure 8 is a detail sectional view taken substantially on the line 8—8 of Figure 1 illustrating one of the butter ribbon guide members.

Our invention, as exemplified in the drawings, has been shown applied to a butter-forming machine which is more especially intended for forming the butter into ribbon form of predetermined dimensions and the ribbon to be delivered to a race-way or runway whereby the cut ribbons of butter are to be delivered to a wrapping machine which is usually provided with a print cutting mechanism.

That is to say, our invention as shown in the drawings is applied to a machine wherein the ribbon of butter is discharged and this ribbon periodically severed into predetermined lengths so as to permit an easier handling thereof on the wrapping machine.

The machine is illustrated in the drawings as an electrically operated machine and comprises a suitable standard or supporting frame 9 adapted to support a suitable electric motor, as at 11, the armature shaft whereof is provided with a suitable coupling, as at 12, whereby connection with the reduction gearing mounted in housing 13 is made; the reduction gearing in turn being operatively connected with the spindle of a spiral worm 14 whose spindle is provided with suitable gearing meshing with the spindle of companion spiral worm 15 so as to cause the two worms to rotate toward each other. These worms are mounted in a suitable casing 16 in the manner usual in print-forming machines; the casing 16 being provided with a receiving hopper or opening as at 17 to receive the chunks of butter which are usually delivered thereto by means of a chute from a point or floor above.

The casing 16, at the delivery end, is provided with a butter forming head 18 having an adjustable throat controlled by the adjustable mechanism indicated at 19 whereby the dimensions or thickness of the ribbon may be controlled or regulated.

The spiral worms 14 and 15, as well as the forming head 18, are chambered to permit the circulation of a heating medium therethrough which is supplied by means of supply line shown in dotted lines at 20 coming from a suitable source of hot water supply; the supply line 20 being provided with a suitable valve at 21; the supply line 20 being provided with a branch line 22 leading into a collar or stuffing box 23 disposed about the ends of the spiral worms and this stuffing box or collar is in turn provided with an outlet pipe at 24 so as to permit circulation of the heating medium through the spiral worms; the heating medium being allowed to discharge through outlet 24. The supply line or pipe 20 is also provided with a pipe 25 which leads into the forming head 18 allowing the heating medium to circulate through the chambers in the walls thereof and to discharge through pipe 26 which connects with outlet pipe 24.

The portions of the machine as thus far described are similar to butter forming machines heretofore made and shown in some of applicants' prior patents and therefore are not now entered into, as the construction of said portions, except as to their relation to the other features of the machine, forms no part of the present invention which relates to an automatically operated machine and more specifically to an electrically operated and controlled machine.

The delivery end of the machine is provided with a butter run-way or race-way at 27 which consists of suitable side frame members or angle irons 28, as shown in Figure 8, disposed lengthwise on opposite sides of the race-way, and which in turn are formed to receive the trunnions of suitable rollers 29 arranged in slight spaced relation throughout the length of the run-way.

At the butter forming head end of the race-way, the supporting frame is provided with suitable brackets, as at 30, which permanently support a pair of guide rods 31 arranged parallel with each other for guiding the butter cutting mechanism which comprises a suitable frame 32 to which an arm 33 is pivotally connected at 34; the forward lower portion of the main frame 32 being formed to receive one end of a cutting wire 35 whose upper end is disposed through a hole 36 in the end of arm 33 and the cutting wire 35 held taut by means of wing-nut 37. The bottom of the cutter frame 32 is provided with a foot portion 38, the opposite sides whereof are slidably mounted on the rods 31 and this foot portion has a pull rod 39 operatively connected thereto.

The pull rod 39 passes through a stuffing box 40 secured to the side of the housing 41 which is arranged at one side of the run-way. The pull rod 39 has a swiveled connection at 42 with a lever 43 located in housing 41. The bottom of lever 43 is fulcrumed at 44 on a suitable bracket 45. The lever 43, intermediate of its ends, is pivotally connected at 46 to a link 47 which, in turn, is pivotally connected with the core of a solenoid 48 which is of well known type.

The inner end of the pull rod 39 slides lengthwise of brace or guide member 49 which is supported by brackets 50 secured within the housing or casing 41. The brace or guide member 49, at opposite ends, is provided with cushioning or bumper means 51 with which the upper end of the lever 43 contacts during its oscillatory movements; the bumper mechanism 51, at the outer end of the bracket 49, being preferably shown adjustable by means of the threaded spindle 52 and lock nuts 53 to permit proper positioning of the outer bumper 51 relative to the stroke of lever 43.

Energization of the solenoid 48 will draw lever 43 toward it and thereby pull the pull rod 39 into the casing 51 causing the cutting frame and cutting wire to move transversely of the run-way. The lever 43 as well as pull rod 39, after solenoid 48 is deenergized, are drawn or moved back to the normal position shown in Figure 5 through the action of spring 54 which is secured by means of rod 55 pivotally connected to the lever 43 at 56; the spring being held in place by the regulable rod 55ª which controls spring tension.

The pull rod 39 is preferably secured substantially along the longitudinal center line of the cutting mechanism or frame 32 and causes the cutting frame 32 to be drawn from the non-cutting position shown in Figure 5 transversely of the butter ribbon run-way into the completed butter cut position shown in Figure 6.

The race-way at points coincident with the cutting mechanism is provided with butter guiding mechanism consisting of the upwardly disposed arms 57 which are preferably provided with wood blocks 58; these guide members, adjacent to the cutting mechanism, being preferably arranged in pairs on opposite sides of the run-way in slight spaced relation to permit the cutting wire 35 to pass between the blocks 58 of each pair of guide members.

The run-way 27, at any suitable point, preferably in proximity to the outer end thereof, is provided with a roller 60 mounted substantially in the plane of the rollers 29 of the run-way in order that it may be engaged by the ribbon of butter, indicated at A in Figures 3 and 4, passing along the run-way. The roller 60 is trunnioned in the upturned end of a lever 61 which is pivoted at 62 to a suitable bracket 63 secured to the bottom of the angle irons 28 of the run-way; with the free end of the lever 61 provided with a counterweight 62$^a$ which is adjustably mounted on the lever. In order to properly guide the roller 60 in its vertical oscillatory movements, the side frame members 28 of the run-way are preferably slotted at 64 to receive the ends of the trunnions of the roller. The lever 61 is shown provided with a set-screw 65 whereby adjustment or regulation of the vertical oscillatory movement of lever 61 and roller 60 may be regulated.

The lever 61 is provided with a depending short arm 66 to which is pivotally connected at 67 rod 68 which extends rearwardly, as shown in dotted lines in Figure 1, and controls a limit switch shown in dotted lines at 69 in Figure 1.

The limit switch 69, which may be of well known construction, is located in a line of a suitable electric circuit to control the current, by means of suitable wiring, for the solenoid 48, as well as for the main driving motor 11.

As the strip of butter A passes down along the run-way 27, the forward end thereof will engage with roller 60 causing the latter to be depressed and maintained in depressed condition until the entire butter strip A has passed over same. As the roller 61 is depressed and lever 61 oscillated, the current to the motor 11 will be shut off and through the medium of limit switch 69 will cause the solenoid 48 to be energized which in turn will actuate the cutting mechanism by pulling lever 43 toward the right in Figure 5, namely into the position shown in Figure 6 which induces the cutting mechanism, namely the cutting wire 35 to pass transversely of the path of the butter thereby severing the same into predetermined lengths. As soon as the cut strip of butter has passed over roller 60, the latter will again return to normal position by reason of counterweight 62 and through the movement of lever 61 actuating the limit switch 69 so as to cut off current to solenoid 48, while allowing current to flow to motor 11 which sets the machine in operation again.

As previously stated, the spiral worms in the hopper 17, as well as the forming head 18, are preferably chambered and supplied with a tempering medium or hot water which is circulated therethrough by the pipes heretofore described.

The supply line 20 of the water conveying system is provided with suitable valve 21 which is intended to be controlled by a suitable solenoid shown in dotted lines at 70 located in a suitable housing 71. The valve 21 is controlled by a suitable lever 72 provided with a counterweight 73; the ends of the lever being controlled by the core of the solenoid 70 when the latter is energized, namely when the current is passing to motor 11 and the butter forming portion of the machine is in operation. The solenoid 70 causes the lever 72 to tilt about its fulcrum point shown in dotted lines at 74, thereby opening valve 21 and allowing the heated medium to flow through supply pipe 20. As soon as the current has been shut off to motor 11 and to solenoid 70 through the actuation of limit switch 69, the counterweight 73 on lever 72 will cause valve 21 to close and shut off the inflow of the heating medium.

The run-way at suitable points lengthwise thereof is also provided with butter guiding rollers 75 mounted on vertically disposed pins 76, see Figure 8, whose lower ends are secured in suitable brackets 77 secured to the angle irons 28 of the run-way. These guide rollers 75 prevent the long strips of butter from moving laterally off the run-way.

As the solenoids and the switch mechanism are of well known construction specific illustration and description thereof is not deemed necessary.

These elements are arranged in an electric circuit so that operation of the switch by the downward movement of lever 61 will interrupt flow of current to motor 11 and solenoid 70 allow flow of current to solenoid 48; while the upward movement of the roller carrying end of lever 61 (through action of counterweight 62) will induce the opposite effect on the current flow.

The invention has been shown in what is believed to be the best embodiment thereof and has been described in terms employed merely as terms of description and not as terms of limitation, as structural modifications are possible and may be made without, however, departing from the spirit of our invention.

What we claim is:

1. In an automatic butter forming and cutting machine having chambered spiral worms and a chambered forming head, an electric motor for operating said worms, heating medium conveying conduits leading to the worms and forming head and provided with a shut-off valve, an electric circuit for said motor, a run-way for receiving the formed ribbon of butter from the forming head, and cutter mechanism arranged to travel transversely of the run-way, in combination with a lever pivoted intermediate of its ends beneath said run-way, one end of the lever being provided with a roller disposed into the path of the ribbon of butter moving along the run-way while the other end of the lever is provided with an adjustable counterweight; limit switch mechanism arranged in the electric circuit; a connecting rod intermediate of said lever and said switch mechanism; a vertically disposed lever pivotally mounted at one end and operatively connected at the other end with said cutting mechanism, said vertical lever having a spring for returning same to normal position; a solenoid arranged in said electric circuit and adapted to actuate said vertically disposed lever and cause the cutter mechanism to move through cutting operation; a pivoted lever for controlling said shut-off valve; a solenoid arranged in said circuit and for controlling said last lever, whereby tilting of the first mentioned lever by the butter moving along the run-way actuates said limit switch mechanism interrupting the circuit to the motor and to the shut-off valve controlling solenoid and admits current to the solenoid of the vertically disposed lever.

2. In an automatic butter cutting and forming machine whereby butter is formed into a ribbon and provided with an electric motor for operating the forming machine, an electric circuit for the motor involving switch mechanism, a run-way for receiving the formed ribbon of butter, and cutting mechanism adopted to reciprocate transversely of the run-way; the combination of a pivoted spring-controlled lever operatively connected with the cutting mechanism; a solenoid for moving said lever against the action of its spring and arranged in said electric circuit; a horizontally disposed counterbalanced lever tiltably mounted intermediate of its ends beneath said run-way with one end provided with a roller arranged to extend into the path of the ribbon of butter moving along the run-way so as to be depressed thereby, said lever having operative connection with said switch mechanism whereby tilting of the second mentioned lever by the ribbon of butter in the run-way will operate said switch mechanism so as to shut off current to the motor and cause said solenoid to be energized and said first mentioned lever to be actuated against its spring and the cutting mechanism moved through butter cutting operation.

3. In an automatic butter forming and cutting machine provided with hollow spiral worms and a chambered forming head; a heating medium for the worms and the forming head; a formed butter receiving run-way at the delivery end of the forming head; and an electric motor for driving the worms; the combination of a valve for controlling the flow of the heating medium, a pivotally mounted lever operatively connected with said valve and having a counterweight for automatically moving said lever in one direction, electrically operated means for moving said lever in the opposite direction, an electric circuit for said electric motor and said means involving a limit switch; with a tiltably mounted lever beneath said run-way, one end whereof is disposed upwardly into the path of the butter moving along said run-way, said lever being adapted to control said limit switch, whereby current to the motor and to said electrically operated means is shut off when the traveling butter tilts said lever.

4. In an automatic butter cutting and forming machine whereby butter is formed into a ribbon and provided with an electric motor for operating the machine, an electric circuit for the motor involving switch mechanism, a run-way for receiving the formed ribbon of butter, and cutting mechanism for the ribbon of butter; the combination of a pivoted spring controlled lever operatively connected with the cutting mechanism; a solenoid arranged in the electric circuit adapted to move said lever against the action of its spring; a tiltably mounted lever beneath said run-way with one end adapted to be depressed by the ribbon of butter passing along the run-way, a counterweight for returning the lever to normal position, said lever having an angularly disposed arm; means whereby the degree of upward movement of the end of the lever toward the path of the butter may be regulated; a control rod between said angularly disposed arm of the tiltable lever and said switch mechanism, whereby tilting of the tiltable lever by the ribbon of butter will operate the switch mechanism to shut off current to the motor and cause the solenoid to be energized so as to actuate the spring controlled lever and thereby move the cutting mechanism through the path of the ribbon of butter.

CHARLES DOERING.
HENRY H. DOERING.